United States Patent [19]
Taylor et al.

[11] 3,781,556
[45] Dec. 25, 1973

[54] NEUTRON ACTIVATION ANALYSIS SYSTEM

[75] Inventors: Morris C. Taylor; John R. Rhodes, both of Austin, Tex.

[73] Assignee: The United States of America as represented by the United States Atomic Energy Commission, Washington, D.C.

[22] Filed: Sept. 8, 1972

[21] Appl. No.: 287,310

[52] U.S. Cl. .................. 250/302, 250/302, 250/499
[51] Int. Cl. ........................................... G01n 23/12
[58] Field of Search ..................... 250/83.1, 83.3 R, 250/43.5 D, 43.5 FC, 43.5 MR, 106 T, 302, 308, 499

[56] References Cited
UNITED STATES PATENTS

| | | |
|---|---|---|
| 3,227,878 | 1/1966 | Nairn et al. ..................... 250/83.3 R |
| 3,389,251 | 6/1968 | Rainbault et al. ........... 250/43.5 MR |
| 3,400,264 | 9/1968 | Bull ............................. 250/43.5 MR |
| 3,644,732 | 2/1972 | Shinnar .......................... 250/43.5 D |

Primary Examiner—Archie R. Borchelt
Attorney—Roland A. Anderson

[57] ABSTRACT

A neutron activation analysis system for monitoring a generally fluid media, such as slurries, solutions, and fluidized powders, includes two separate conduit loops for circulating fluid samples within the range of radiation sources and detectors. Associated with the first loop is a neutron source that emits a high flux of slow and thermal neutrons. The second loop employs a fast neutron source, the flux from which is substantially free of thermal neutrons. Adjacent to both loops are gamma counters for spectrographic determination of the fluid constituents. Other gamma sources and detectors are arranged across a portion of each loop for determining the fluid density.

7 Claims, 5 Drawing Figures

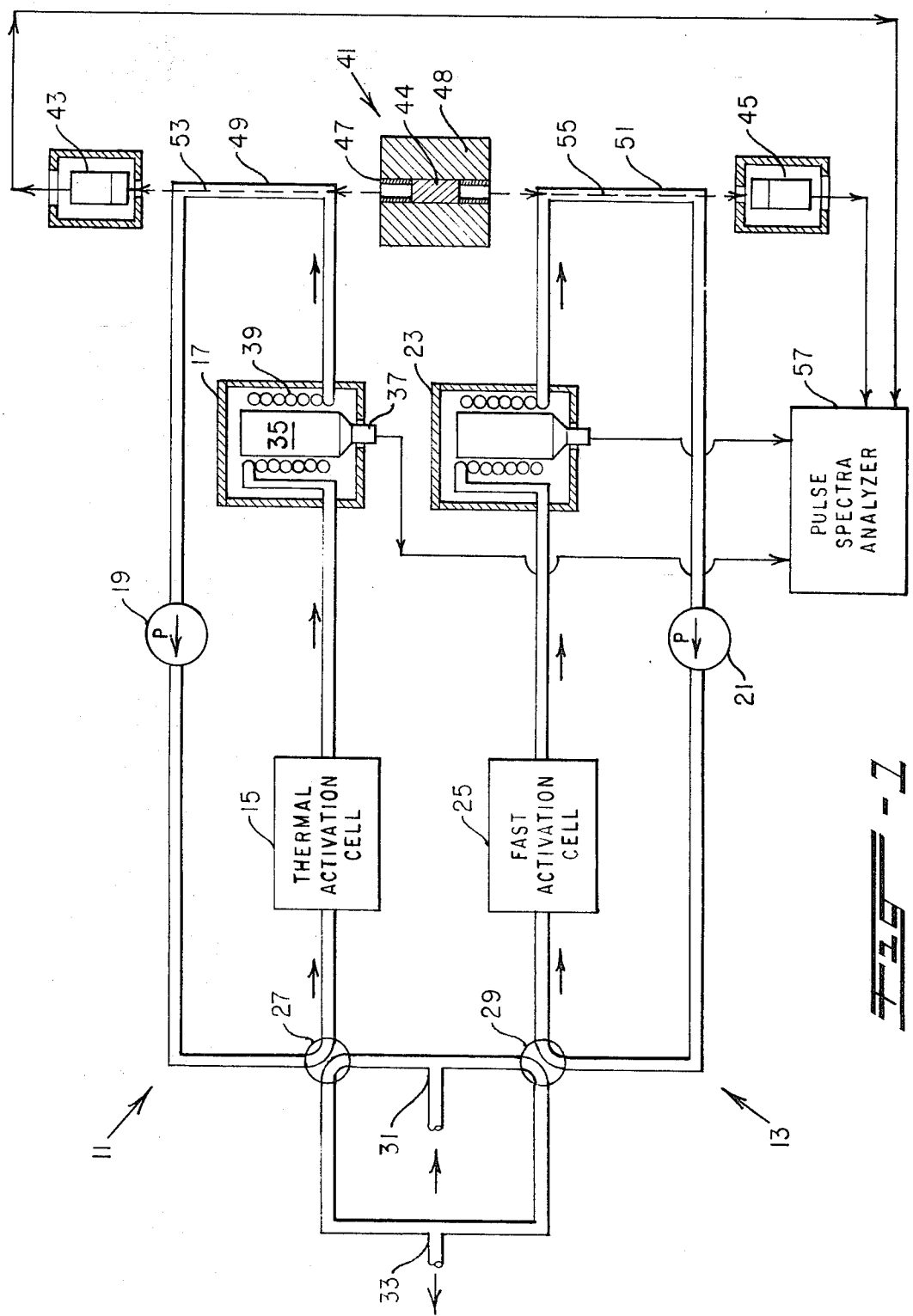

NEUTRON ACTIVATION ANALYSIS SYSTEM

BACKGROUND OF THE INVENTION

This invention was made in the course of or under a contract with the United States Atomic Energy Commission.

1. Field of the Invention

The present invention relates to neutron activation analysis systems for the analysis of various fluid media, such as solutions, slurries, and fluidized powders in process. It has particular applicability for monitoring a slurry of cement raw mix during manufacturing and blending operations.

A typical cement raw mix (i.e., before roasting to form cement) consists mainly of limestone with a representative analysis in terms of oxides as follows: 44 percent CaO, 13 percent $SiO_2$, 4 percent $Al_2O_3$, 2 percent $Fe_2O_3$ with the balance mainly $CO_2$ and $H_2O$. Minor and trace quantities of other elements, such as K, Na, Ti and Mn are also present. These solids ultimately combine into silicate salts, e.g. $3CaO \cdot SiO_2$, $3CaO \cdot Al_2O_3$, and $2CaO \cdot SiO_2$. It is important that the mixture of ingredients in the raw mix be controlled accurately because cement of acceptable quality depends on the precise quantities of the silicate salts produced in the roast step. Quality control ordinarily involves the elemental analysis of Ca, Si, Al, and sometimes Fe and Mg; the former three elements have the most significance in the production of cement.

2. Description of Prior Art

Previous quality control procedures, in the cement industry, have generally involved laboratory chemical analysis of slurry or mixture samples. Since quantitative chemical techniques are time consuming, large volumes of cement can be produced before a variation from the required specification is discovered. Another technique frequently employed is X-ray fluorescence, particularly for the analysis of iron concentrations. However, due to the limited penetration of the characteristic X-rays, unreliable analyses are often encountered.

Neutron activation analysis has been suggested for on-stream monitoring of various slurries, including ores, coal and cement. See Californium-252 Progress No. 5, pp. 30–32, November 1970 and No. 7, pp. 28–32, April 1971. However, considerable interference and confusion results in a spectrum analysis of the various activation products. For instance, 27Mg and 56Mn, produced by the neutron activation of 27Al, 26Mg, 55Mn, and 56Fe, emit gamma radiation of nearly the same energy. In addition, both 27Al and 28Si are activated to produce the same radioactive isotope 28Al. Another problem occurs in the activation of 48Ca which requires a high thermal neutron flux for sufficient production of radioactive 49Ca to form a measurable peak. Consequently, an ordinary activation spectrum of a typical cement slurry will not provide sufficient data to accurately determine the constituents.

SUMMARY OF THE INVENTION

Therefore, it is an object of the present invention to provide a system and method for the neutron activation analysis of the constituents of generally fluid media, such as slurries, solutions, and fluidized powders.

It is also an object to provide an accurate, on-stream, system for the analysis of cement slurries, particularly in reference to the calcium, silicon, and aluminum content.

It is a further object of this invention to provide a method for resolving neutron activation spectra for the identification of cement slurry constituents.

A dual loop, neutron activation analysis system is provided for the monitoring of the various constituents within slurries, solutions, and fluidized powders, particularly cement slurries. Separate samples are made to circulate within each of the two loops. Adjacent to the first loop is disposed a neutron source for generating a neutron flux that includes a substantial proportion of thermal neutrons followed in flow sequence by a gamma radiation detector for registering the resulting activation gamma spectrum. A second neutron source is disposed adjacent to the second loop and generates a fast neutron flux substantially free of thermal neutrons. A gamma radiation detector adjacent to the second loop downstream from the corresponding neutron source senses an activation gamma energy spectrum having somewhat different characteristics from that produced by the thermal neutron source. The outputs of both gamma detectors are transmitted to a pulse spectra analyzer for pulse discrimination according to pulse energy.

In the analysis of cement slurries, it is particularly important that calcium, silicon and aluminum concentration be accurately determined. A cement slurry sample irradiated by thermal neutrons within the first loop will produce radioisotopes from the stable isotopes of these elements in accordance with the reactions: $48Ca(n,\gamma)49Ca$, $28Si(n,p)28Al$ and $27Al(n,\gamma)28Al$. In the second loop, the following reactions predominate: $28Si(n,p)$ $28Al$, $27Al(n,p)$ $27Mg$, with only a small contribution from the reaction $27Al(n,\gamma)28Al$. Previous calibration of the individual element contributions toward each radioisotope produced, in each activation loop, allows resolution of all of the reaction equations to determine the individual amounts of calcium, silicon, and aluminum.

DESCRIPTION OF THE DRAWINGS

The present invention is illustrated in the accompanying drawings wherein:

FIG. 1 is a schematic diagram of a dual loop fluid analysis system.

DETAILED DESCRIPTION OF THE PREFERRED EMBODIMENTS

Figure 3:
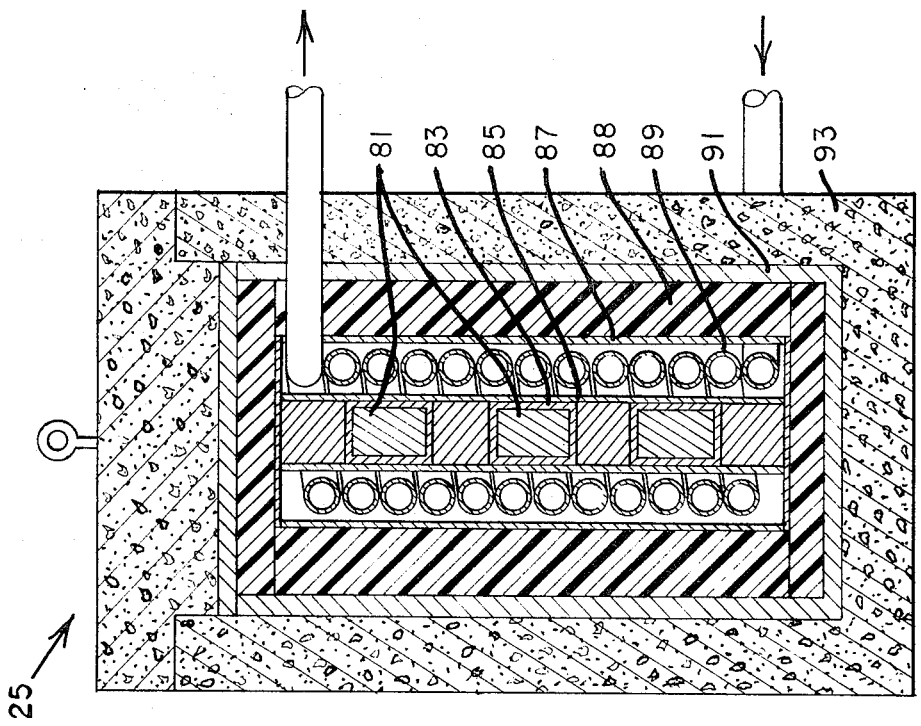
FIG. 3 is a detailed cross section view of the fast neutron activation cell of FIG. 1.

In reference to FIG. 1, there is shown a schematic of the apparatus of the dual loop, fluid analysis system of the present invention. A first neutron activation loop 11 includes a thermal neutron activation cell 15, a first gamma radiation detector unit 17, and a pump 19 for circulating a fluid, such as a slurry, through the conduit system connecting the activation cell and detector. The second loop, indicated at 13, also includes, within a suitable conduit system, a circulation pump 21 and second gamma detector unit 23, but differs from the first loop by including a fast neutron activation cell 25. Both activation cells are more fully described hereinbelow in connection with the description of FIGS. 2 and 3.

Double L valves 27 and 29 are disposed within the loops to charge and discharge slurry or other fluid into the conduits of each of the two loops 11 and 13, respectively. When the valves are positioned as shown in FIG. 1, the slurry can be circulated within each of the two loops and any new material entering inlet 31 will be bypassed directly to discharge 33. When rotated 90° from the position shown in FIG. 1, the loop can be charged or flushed as required. Of course, those skilled in the art will recognize that various other suitable valving arrangements can be provided to accomplish the same or similar purposes.

Radiation detector units 17 and 23 can be any gamma radiation detector capable of adequately resolving the energy spectra for the particular radioisotopes to be analyzed. A gas-filled electronic proportional counter or a lithium-drifted germanium semiconductor could be employed; however, in the present invention, a thallium-doped sodium iodide crystal 35 is preferred due to its ruggedness and relatively low cost. Associated with crystal 35 is a suitable photoelectric device 37 for sensing light scintillations resulting from radiation incursions into crystal 35. Additional sensitivity is achieved by circulating the slurry through conduit coils 39 positioned adjacent to the exposed surfaces of crystal 35 to approximate a $4\pi$ monitoring configuration. Radiation detector unit 23 within the fast activation loop 13 will ordinarily be of similar construction to detector 17.

Associated with both of the neutron activation loops is a density analyzer illustrated as a gamma radiation source 41 and two gamma detectors 43 and 45. Source 41 is disposed between conduit end portions 49 and 51 of the activation loops, while the detectors are each aligned to face the gamma radiation source on the outside of each conduit end portion. These detectors can also be NaI(Tl) crystals and photoelectric device combinations or other suitable radiation detection devices. Gamma source 41 includes a radioisotope 44 such as cesium-137 or cobalt-60 surrounded by shielding material 48. A strong gamma source is preferred to reduce any errors arising from residual activation products in the circulating slurry. Collimator rings 47 are positioned at each end of the radioisotope 44 within shielding 48. The rings are aligned to focus beams of gamma radiation, represented by dashed lines 53 and 55, longitudinally through conduit portions 49 and 51 and into gamma detectors 43 and 45, respectively. By directing the gamma beams through the two conduit portions, a sufficient length of slurry in conduits 49 and 51 can be inspected to accurately measure the slurry density from the attenuation of the gamma beams. The density analyzer is typically calibrated as percent solids in the slurry to allow the constituent compositions to be related to the solids rather than merely the total slurry flow.

A pulse spectra analyzer 57 is provided to receive and analyze the outputs of detector units 17 and 23 and detectors 43 and 45. This analyzer can be a system of state of the art electronic and computing components including a multichannel analyzer capable of cooperating with the gamma radiation detectors to segregate pulses in accordance with height or energy. A computing system may also be desirable to combine the gamma spectra and attenuations obtained from each detector so as to obtain the weight percent of each constituent in the solids. The manner in which such a computation can be performed will become apparent from the discussion below regarding FIGS. 4 and 5.

Figure 2:
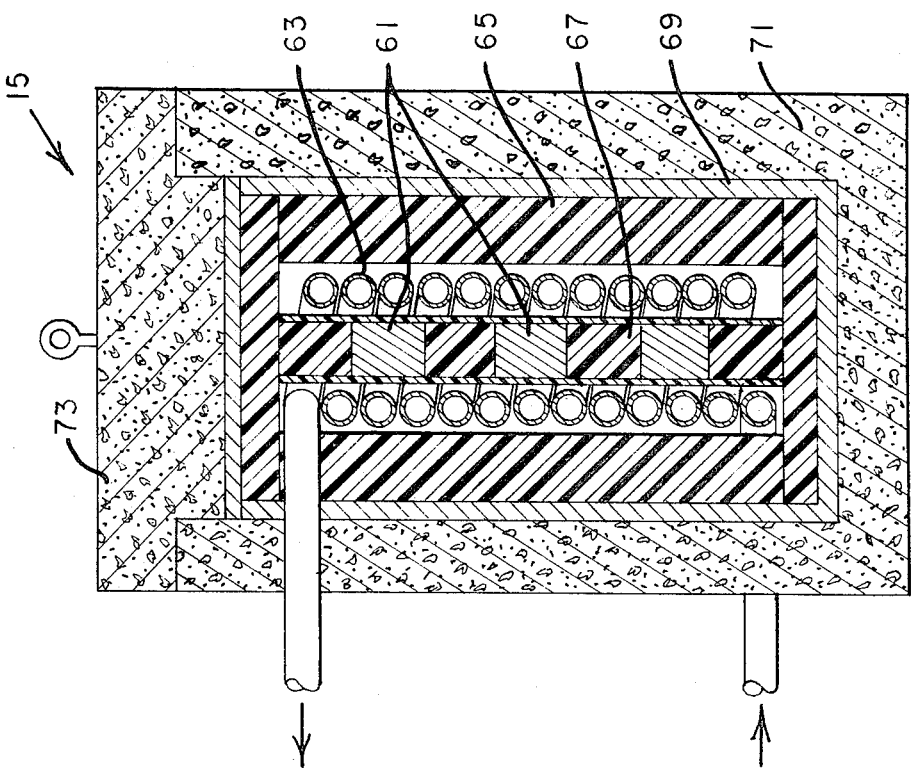
FIG. 2 is a detailed cross section view of the thermal neutron activation cell of FIG. 1.

Turning now to FIG. 2, a more detailed illustration of the thermal neutron activation cell 15 is presented. A plurality of isotopic neutron sources 61 are longitudinally arranged in a linear array along the central axis of the thermal activation cell. Thus, the neutron flux is emitted in an approximate cylindrical geometry to provide a more uniform irradiation of the surrounding slurry conduit 63. A similar effect can be produced by a single elongated neutron source. Conduit 63 is formed into a closed helical coil around the neutron sources to provide maximum exposure of slurry to the neutron flux. Although, not shown, a spiral of the slurry conduit can be disposed over both ends of the helix to further increase the radiation exposure of the circulating slurry. An annular member 65 of neutron moderating material of a suitable hydrogenous material surrounds the neutron sources 61 and conduit 63. Suitable spacers 67 may be disposed between the individual neutrons sources in the array.

The neutron sources 61 selected for use in the thermal activation unit must be capable of emitting a high flux of slow and thermal neutrons for the activation of calcium-48 in cement slurries. A source output of $10^8$ to $10^9$ neutrons per second is preferred for this task which can be efficiently supplied by californium-252 neutron source material. Moreover, californium-252 produces a relatively low energy neutron flux that can be readily thermalized.

The neutron sources, helical conduit, and moderator are surrounded by heavy metal, e.g., lead, shielding material 69 to intercept prompt gamma radiation produced during the first few fractions of a second after neutron capture. Additional neutron shielding material is shaped into an enclosure 71, including a lid 73 with an offset mating portion to prevent radiation streaming.

FIG. 3 shows an embodiment of the fast neutron activation cell 25. A plurality of neutron sources 81 are each enclosed within a layer of thermal neutron absorbing material 83 and arranged in a longitudinal axial array. A second enclosure 85 of thermal neutron absorbing material also surrounds the neutron source array. It may also be necessary to place an intermediate layer of neutron moderating material between the thermal neutron material 83 and enclosure 85. As in the thermal activation unit, a helical coil of conduit 89 is formed around the neutron source array for irradiation of the slurry flow. An additional thermal neutron absorber 87 is disposed between the helical conduit 89 and a neutron moderating material 88. Also, suitable biological shielding material is shown as a lead barrier 91 and an outside enclosure 93 of boron filled hydrogenous material for absorbing neutron radiation. Thus, both thermal neutrons emitted by the source and readily thermalized slow neutrons are absorbed within the two enclosures 83 and 85 of absorbing material and neutrons thermalized within the shield are absorbed by the additional absorber 87. As an example, cadmium could be effectively employed as the neutron absorbing material in layers 83, 85, and 87.

A number of isotopic neutron sources could be selected for use as source 81. For instance, 252Cf, or an alpha source combined with 9Be, might be selected. For an industrial cement analyzer system, the fast neutron activation cell does not require as great a neutron flux as the thermal activation cell. A neutron source output of between $10^7$ to $10^8$ neutrons per second will be adequate in most of such applications. Consequently, due to economic factors, a 238Pu-9Be neutron source would be preferred over the 252Cf source for this cell.

As one example of how the dual loop fluid media analysis system can be operated, a simulated cement slurry containing about 44 percent CaO, 13 percent $SiO_2$, 4 percent $Al_2O_3$, 2 percent $Fe_2O_3$, and a trace of mangenese in 50 percent by weight water was prepared and separate portions circulated through each of the two neutron activation loops illustrated in FIG. 1.

Figure 4:
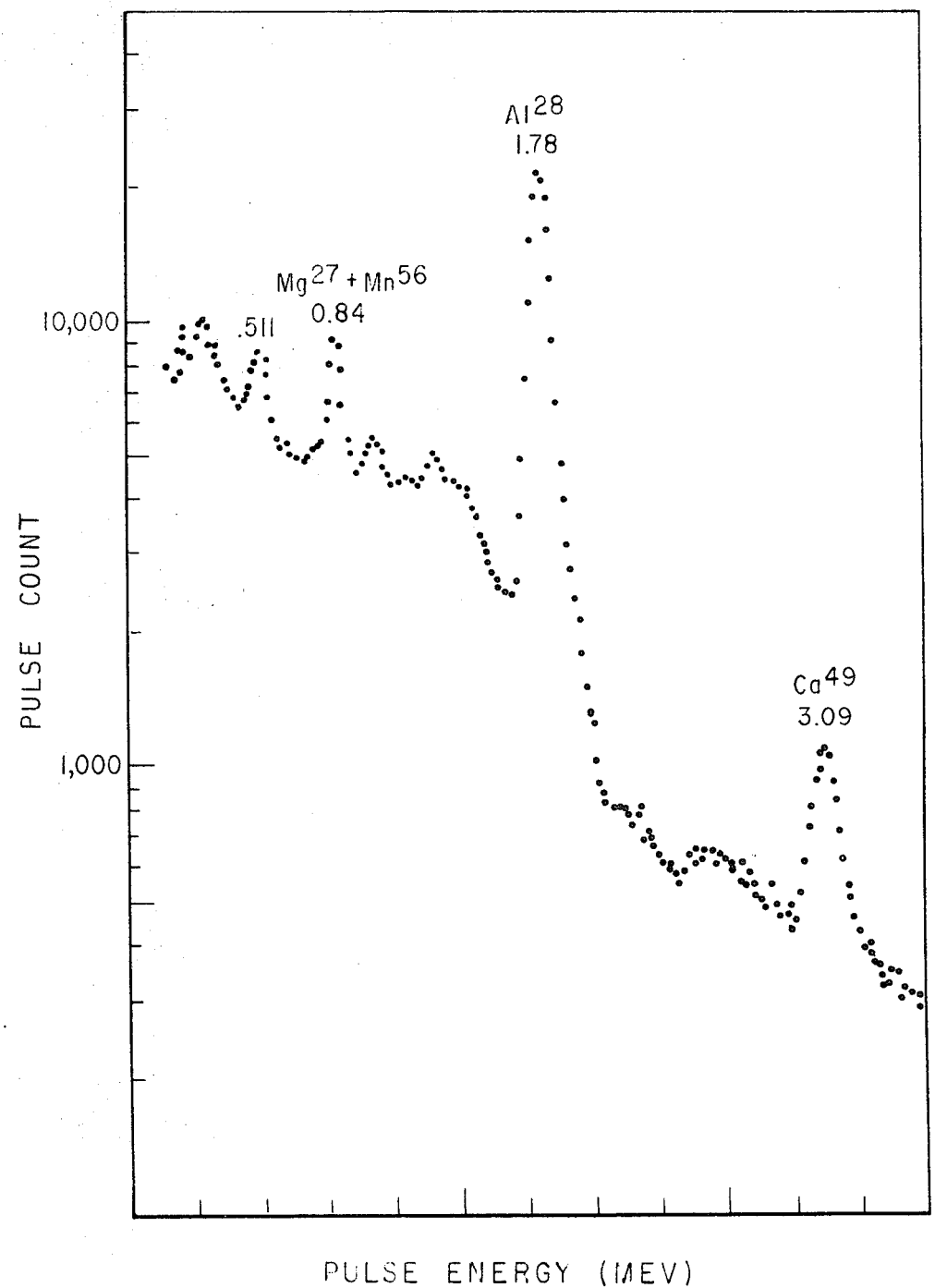
FIG. 4 is a graphic illustration of a pulse energy spectrum derived from the analysis of a cement slurry within the thermal neutron activation loop of FIG. 1.

Within the first activation loop 11, the slurry was bombarded with a large flux of thermal neutrons and a number of radioisotopes were produced by transmutation of some of the stable elements in the slurry. A spectrum of the gamma emissions from these radioisotopes is resolved by a multichannel pulse height analyzer, and illustrated in the spectograph shown in FIG. 4. The prominent peaks in FIG. 4 are identified with the symbol of the radioisotope and the magnitude of gamma pulse energy emitted. The peak of 0.511 MeV results from electron-positron annihilation and is not of concern in this analysis. The peak at 0.84 MeV is produced by emissions from both radioactive magnesium-27 and manganese-56. The respective peaks are actually at 0.835 MeV for 27Mg and 0.857 MeV for 56Mn, but they cannot be easily distinguished. Magnesium-27 results from the activation of aluminum in accordance with the reaction $27Al(n,p)27Mg$. It may also occur in cement slurries containing magnesium oxide from $26Mg(n,\gamma)27Mg$. Manganese-56 is readily produced from even small quantities of $MnO_2$ as might be found as an impurity in $CaCo_3$. The reaction $55Mn(n,\gamma)56Mn$, having a very high cross section, will, therefore, account for most of this radioisotope; however, a small portion can be produced by the activation of iron by $56Fe(n,p)56Mn$.

The gamma emission of aluminum-28 is shown at 1.78 MeV and results from both the activation of silicon and aluminum as follows: $27Al(n,\gamma)28Al$ and $28Si(n,p)28Al$. For the particular slurry described above, the aluminum activation accounts for about 90 percent of the aluminum-28, but this will vary with different slurry mixtures. Thus, it can be seen that neither the peak at 1.78 nor at 0.84 MeV can be used to determine the aluminum and silicon concentrations.

The peak of highest energy shown in FIG. 4 is at 3.09 MeV representing the activation of calcium: $48Ca(n,\gamma)49Ca$. Since this is the only reaction that is likely to produce this peak, it can be employed for the determination of calcium in the slurry. This reaction, however, requires a high output source of about $10^9$ neutrons per second to activate a sufficient amount of calcium for analysis in a reasonable time.

Figure 5:
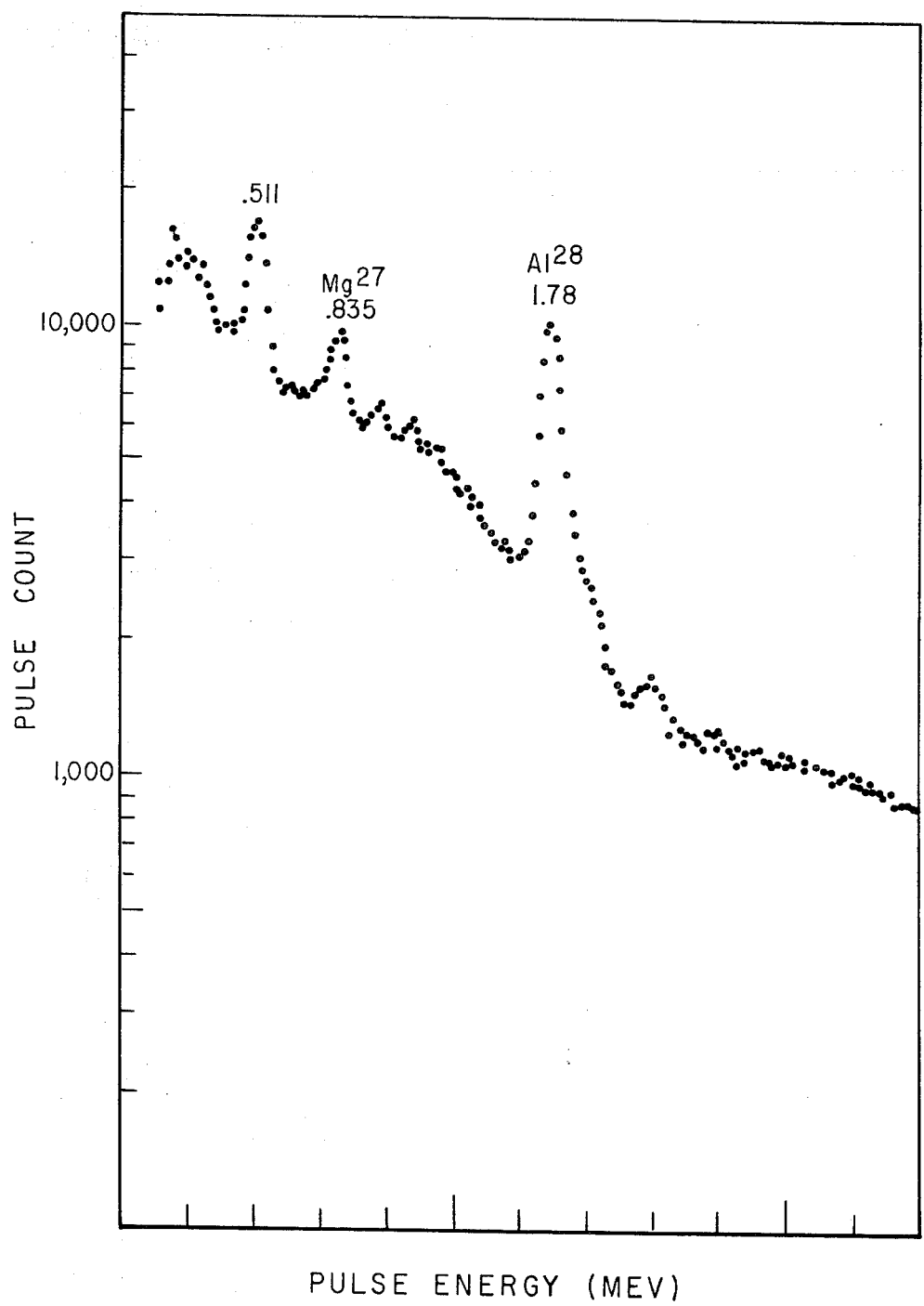
FIG. 5 is a graphic illustration of a pulse energy spectrum derived from the analysis of a cement slurry within the fast activation loop of FIG. 1.

FIG. 5 illustrates a spectrograph of gamma energy peaks that are produced by activation within the fast neutron activation cell. Here thermal neutron activation has been eliminated by cadmium shielding around a 238Pu-9Be neutron source. No peak at 3.09 MeV appears, but as previously stated, calcium can be determined solely from the thermal neutron activation. At the 4 MeV neutron energy level of the 238Pu-9Be source, the spectrum peak at 0.835 MeV gamma energy is produced almost exclusively by the reaction: $27Al(n,p)27Mg$. The activation of manganese, magnesium and iron does not significantly interfere with the determination of aluminum at this neutron energy level. The peak at 1.78 MeV is due in the major part to the reaction: $28Si(n,p)28Al$, with only a minor contamination from the aluminum reaction $27Al(n,\gamma)28Al$. Accordingly, silicon can be determined by correcting the peak by the amount of aluminum present. Confirmation of the amount of aluminum in the slurry can be obtained by eliminating the minor silicon contribution from the 1.78 MeV(28Al) peak in FIG. 4.

In employing the dual loop slurry analysis system for the determination of constituents, it is necessary to calibrate the system with known concentrations of slurry. The pulse count contribution for each constituent in each peak can thereby be obtained. Table I presents a typical calibration for a 50 percent solid slurry of cement raw mix.

TABLE I

CALIBRATION FOR 50% SOLIDS SLURRY OF CEMENT RAW MIX

| Component | Source | Peak (MeV) | Counts/% Concentration | Std. Dev. |
|---|---|---|---|---|
| CaO | Cf-252 | 3.09 | 417 | 0.4% CaO |
| $Al_2O_3$ | Cf-252 | 1.78 | 94,200 | 0.01% $Al_2O_3$ |
| $SiO_2$ | Cf-252 | 1.78 | 3,260 | 0.2% $SiO_2$ |
| $Al_2O_3$ | Pu-Be | 0.835 | 12,200 | 0.1% $Al_2O_3$ |
| $Al_2O_3$ | Pu-Be | 1.78 | 970 | 1% $Al_2O_3$ |
| $SiO_2$ | Pu-Be | 1.78 | 8,210 | 0.1% $SiO_2$ |

Slurries having other than 50 percent solids can be identified by an appropriate calibration of the density analyzer and suitable corrections made to Table I for any deviations in density. Where large variations in density are expected, recalibration for slurries having different solids content may be required.

It will be apparent that the present invention provides a novel system and method for the neutron activation analysis of mineral slurries and fluidized powders. The system can be employed for the monitoring of cement slurry flows to ensure correct proportion of CaO, $Al_2C_3$ and $SiO_2$. These constituents are determined by the neutron activation analysis with two separate neutron activation units in two separate slurry loops. The activation units employed emit neutron spectra of different energies; the one unit generating a preponderance of thermal neutrons while the other emitting substantially no thermal neutrons. Interfering neutron activation reactions can thereby be eliminated from consideration and the slurry constituents accurately determined.

What is claimed is:

1. A system for the neutron activation analysis of fluid media which comprises:
   a. A first activation analysis loop including a neutron source for generating a neutron flux that includes a substantial flux of thermal neutrons, a radiation detector for sensing gamma radiation produced as a result of activation by said neutron flux, and conduit means for circulating a first portion of fluid proximate to said neutron source and gamma detector;
   b. A second activation analysis loop including a neutron source for generating a fast neutron flux that is substantially free of thermal neutrons, a radiation detector for sensing gamma radiation produced as a result of activation by said fast neutron flux, and conduit means for circulating a second portion of said fluid proximate to said neutron source and gamma detector; and c. Pulse spectroscopy means for processing the outputs of said radiation detectors to determine the constituents of said fluid.

2. The neutron activation analysis system of claim 1 that includes gamma attenuation means for determining the density of said fluid, said gamma attenuation means including a gamma radiation source positioned to transmit a gamma beam through a portion of said conduit means in each of said loops, and a gamma detector oppositely disposed across said conduit means from said gamma radiation source for receiving said gamma beam.

3. The neutron activation system of claim 1 wherein said first activation loop includes a 252Cf neutron source and said second neutron activation loop includes a 238Pu-9Be neutron source having a layer of neutron absorbing material surrounding the outside surface thereof.

4. The neutron activation system of claim 1 wherein said neutron source for generating a fast neutron flux includes a plurality of isotopic neutron sources each enclosed within a cadmium envelope.

5. The neutron activation system of claim 1 wherein said first activation loop includes a plurality of 252Cf neutron sources arranged in an axial array within a helical coil disposed within an enclosure of neutron moderating material.

6. A method for determining constituents within a cement slurry which comprises:

a. Irradiating a first portion of said slurry with a flux of slow neutrons including a substantial number of thermal neutrons to produce radioisotopes from stable elements of calcium, silicon, aluminum in accordance with the reactions 48Ca($n,\gamma$)49Ca, 28Si($n,p$)28Al, and 27Al($n,\gamma$)28Al;

b. Quantitatively detecting radiation from 49Ca and 28Al to respectively determine the proportion of calcium in said slurry and an indicia of the combined proportion of aluminum and silicon in said slurry;

c. Irradiating a second portion of said slurry with a fast neutron flux, that is substantially free of thermal neutrons, to produce radioisotopes from stable elements of silicon and aluminum in accordance with the reactions 28Si($n,p$)28Al, 27Al($n,p$)27Mg and a small contribution of 27Al($n,\gamma$)28Al;

d. Quantitatively detecting radiation from said 27Mg and 28Al to respectively determine the proportion of aluminum in said slurry and a second indicia of the combined proportion of aluminum and silicon in said slurry; and e. Resolving said first and second indicia in accordance with said proportion of aluminum to determine the proportion of silicon and to confirm said proportion of aluminum in said slurry.

7. The method according to claim 6 wherein said first and second slurry portions are recycled through said flux of slow and said flux of fast neutrons until sufficient radioisotopes are produced to perform said determination.

* * * * *